INVENTORS
Ronald Charles Newman
James Wakefield
Robert Lindsay Rouse
BY
Larson and Taylor Jan. 22, 1963 R. C. NEWMAN ETAL 3,074,146

PRODUCTION OF UNIPOLAR TRANSISTORS

Filed June 20, 1960 2 Sheets-Sheet 2

INVENTORS
Ronald Charles Newman
James Wakefield
Robert Lindsay Rouse
BY
Lawson and Taylor 3,074,146
PRODUCTION OF UNIPOLAR TRANSISTORS Ronald Charles Newman, Earley, Reading, James Wakefield, Beenham, near Reading, and Robert Lindsay Rouse, Caversham, Reading, England, assignors to Associated Electrical Industries Limited, London, England, a British company Filed June 20, 1960, Ser. No. 37,325
Claims priority, application Great Britain June 23, 1959
5 Claims. (Cl. 29—25.3)

This invention relates to the production of transistor structures of the unipolar type in monocrystal semiconductor material.

In the unipolar type of transistor, current is transported by majority carriers between source and drain electrodes making ohmic contact with a body of semiconductor material, the current being controlled by the application of a potential of suitable polarity applied by means of a low resistance contact to a gate electrode, or electrode located on the body at a position between the source and drain electrodes. The potential applied to the gate contact serves to produce an electric field which constricts, to a greater or lesser extent, the path available for the flow of majority carriers.

In the invention described and claimed in application Serial No. 15,934 filed March 18, 1960, by Ronald Bullough, Ronald Charles Newman, James Wakefield, Robert Lindsay Rouse and John Bernard Willis, and assigned to the assignee of the present application, there has been described the preparation of p-n junction structures by means of the controlled diffusion and precipitation of suitable impurity activators at internal crystal defects in semiconductors. It is the object of the present invention to describe how these techniques may be applied to the preparation of unipolar field effect type transistors.

Figure 1:
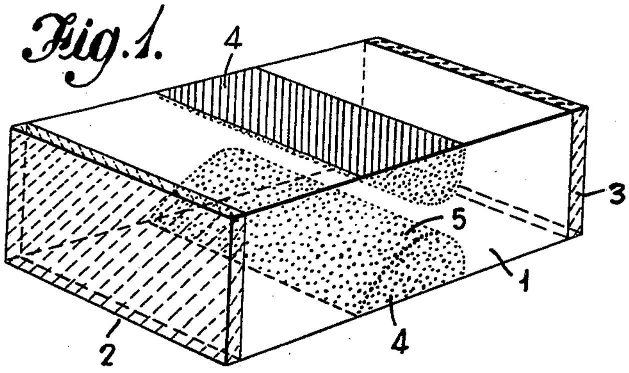

The operation of such a transistor is illustrated in FIG. 1 of the accompanying drawings which shows the well-known type of configuration for a unipolar transistor due to Shockley.

In FIG. 1 a monocrystalline semiconductor body 1 is provided with a source and drain electrodes 2, 3 respectively, which make ohmic contact with the body, and with gate electrodes 4 which have an additional pair of contacts known as the gate contacts. The gate electrodes 4 are made rectifying with respect to the body 1, for example by alloying. In operation, if the body is made of n-type material, which is usually of high resistivity, i.e. contains a small concentration of electrons or holes, then the drain electrode 3 is made positive with respect to the source electrode 2. As a result, current flows by drift of electrons from source to drain. If now a reverse, i.e. negative, bias is applied to the gate electrode 4 the space charge region extends into the body of the semiconductor, as shown. Since the electron current cannot pass through this space charge region, the resistance of the semiconductor body increases and the current is reduced. If a sufficient negative bias is applied to the gate electrode 4 then the space charge regions 5 extend right across the semiconductor body and the current is reduced to a very small value. This is known as the "pinch-off" condition.

An alternative geometrical configuration is the cylindrical case, in which the semiconductor body is of circular cross-section and the gate electrode extends completely round the circumference of the body.

It is evident that a similar control effect may be obtained if instead of producing the gate electrode by forming a p-n junction contact on to an existing semi-conductor body, a region of opposite conductivity type is formed in the body and body itself is employed as the gate electrode. An analogous configuration, for both the rectangular and cylindrical cases may then be conceived.

Figures 2, 3:
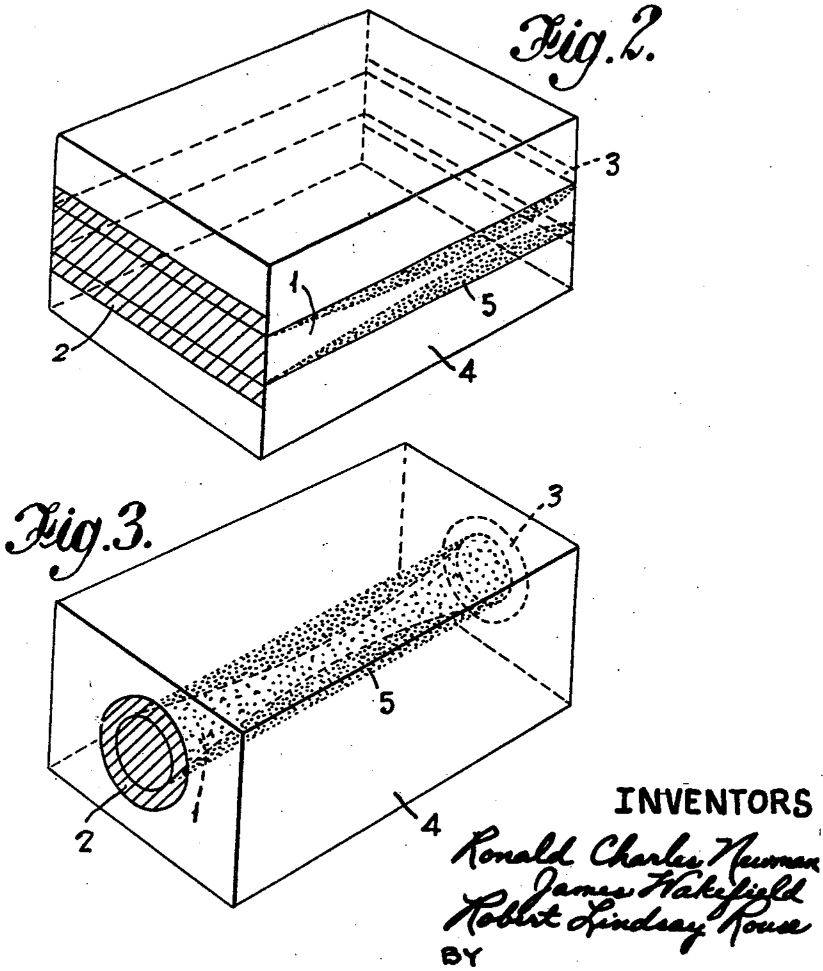

This is illustrated in FIGS. 2 and 3 of the accompanying drawings for the rectangular and cylindrical cases respectively, where the same reference numerals as were employed in describing FIG. 1 have been employed to indicate the corresponding parts of the transistor. It will be seen that the current to be controlled flows in the high resistivity region 1 of opposite conductivity type to that of the main body of semiconductor material, the main body 4 then serving as the gate electrode. For example, the region 1 may be of n-type conductivity and be produced in a body of p-type conductivity to form the current carrying part of the transistor. It is obviously necessary that the source 2 and drain electrode 3 are made in such a way as to be ohmic with respect to the current carrying region, but rectifying with respect to the bulk material forming the gate. This can be achieved for example by suitable alloying. The operation of the transistor takes place in essentially the same manner as that described above.

According to the present invention a unipolar transistor structure is produced by heating a body of mono-crystal semiconductor material containing impurity activitors of opposite conductivity types so as to produce controlled diffusion and precipitation at a crystal dislocation, or internal crystal boundary of one or more of the activators, whereby to deplete the region immediately surrounding the dislocation or crystal boundary, of one type of impurity activator and thereby to form an adjacent region of opposite conductivity type to that of the body, and attaching to the body at opposite ends of the region so produced contacts making ohmic connection to the region and rectifying connection to the body, one or more ohmic contacts being made to the body for the purpose of enabling the electric field extending across said region, and thereby the current flow between the contacts at the opposite ends of said region, to be controlled.

The carrying out of the invention will now be described with particular reference to silicon as the semiconductor, with aluminium as the p-type activator impurity and with phosphorus as the n-type activator impurity. Both the p-type and n-type impurities, used to form a junction, are introduced into the crystal in a substantially uniform concentration before the heat treatment takes place. This so-called "doping" of the crystal can be carried out during the crystal-growing process, i.e. when mono-crystalline semiconductor material is being grown from the melt, by doping the melt with both aluminium and phosphorus. The aluminium is made to be present in the higher concentration so that the crystal is initially of p-type. For example, the aluminium may be present in a concentration approximately $10^{17}$ atoms per cc., and the phosphorus in a concentration somewhat less, the internal surface concentration being approximately $10^{16}$ atoms per cc., or a little higher, depending on the temperature. For diffusion of impurities to occur, the silicon is heated at a high temperature so as to allow the atoms to diffuse through the crystal lattice. This temperature may conveniently be in the range 1200–1250° C. although temperatures somewhat outside this range could be used. Typically, the silicon bodies may be sealed into a quartz container which is evacuated or which contains an inert gas, the whole container then being heated in a resistance furnace.

To understand the process of the invention, the formation of p-n junctions at the external surface of a body of mono-crystal material by diffusion outwards may first be considered and we then, by analogy, describe the formation of p-n junctions at the dislocations. The aluminium which is at the surface of the silicon will, at the high temperature at which the heating is effected, combine with oxygen present in the atmosphere or in the silicon crystal itself, to form a stable aluminium-oxygen complex at the surface. The aluminium has a greater affinity for this complex than it has for the interior of the silicon crystal, so that the surface may be considered as forming a sink for aluminium. Aluminium thus flows from the internal regions of the crystal towards the surface, by diffusion. There is negligible diffusion flow of phosphorus towards the surface as the phosphorus concentration is not affected by the presence of oxygen. A planar p-n junction will thus form at a certain distance from the surface, where the aluminium concentration equals the phosphorus concentration.

In the same way as described for the external surface, aluminium can combine with oxygen at dislocations to form a stable complex at the dislocation. The oxygen is already present in the crystal, if this is prepared in quartz crucible. Hence, there will be a preferential flow of aluminium, relative to phosphorus, to the dislocation. The aluminium which flows to the core of the dislocation is effectively taken from the surrounding region of the crystal, and once it reaches the core of the dislocation it ceases to act as an activator impurity. Thus, the aluminium concentration is reduced in the region surrounding the core of the dislocation, leaving the phosphorus in excess. Hence, there is an n-type region, bounded by a p-n junction formed coaxially round the dislocation; the p-n junction is thus of cylindrical shape for a tubular dislocation.

The extent of the aluminium depletion depends primarily on the temperature and time of heat treatment, and hence the width of the p-n junction can be controlled by varying the temperature and time of heating. The width of the p-n junction also depends on the initial ratio of phosphorus to aluminium in the crystal, and this ratio can be readily controlled as part of the crystal-growing process.

The precipitation of aluminium in the manner described can be ensured by introducing a high concentration of oxygen into the crystal; this can conveniently be done during the crystal-growing process, e.g. by using a quartz crucible. The aluminium and oxygen form a stable complex at the dislocation core during the heating, whereas the phosphorus concentration is little if at all affected by the presence of oxygen. Any other impurity which combines with aluminium to form a stable complex may also be used.

When the dislocation is in the form of a line dislocation, the p-n junction structure takes the form of a tubular core of n-type material of small cross-sectional area in a p-type matrix (see FIG. 3). The cross-sectional area of the n-type core can be readily controlled by adjustment of (*a*) the temperature of heat treatment, (*b*) the time of heat treatment, and (*c*) the concentrations of aluminium and of phosphorus in the crystal. When the crystal body contains a planar crystal boundary, the junction structure will be as illustrated in FIG. 2. The distance between the junctions will again be controlled by the condition above-mentioned.

In any mono-crystal body of silicon or other crystalline material, there will normally be a certain number of dislocations or crystal boundaries around which the p-n junctions will be formed as hereinbefore described.

Control over the distribution of the dislocations, or crystal boundaries, can be effected by careful control over the conditions of crystal growth, in particular the seeding operation, crystal orientation, temperature distribution in the solid and liquid, growth rate and mechanical vibration. Where a crystal boundary is required, the seed crystal may be selected with, or made to contain, the boundary which is reproduced in the growth crystal.

A wafer of suitable thickness is cut from the grown crystal. The dislocation or boundary is located on the surface of this wafer by an etching procedure. A suitable etch for this purpose consists, for example, of a mixture of hydrofluoric acid, nitric acid, and acetic acid in the proportions 1 HF, 3 $HNO_3$, 10 $CH_3COOH$. This etch leads to the formation of an etch pit where the dislocation or boundary intersects the surface.

After heat treatment, a thin surface layer is removed by grinding or other means. This removes the n-type surface skin which is formed on heat treatment, as hereinbefore described. The p-n junction profile can then be delineated on the surface of the crystal by etching, for example, in a mixture of 50% hydrofluoric acid, 50% nitric acid, or, alternatively, in the etch described above. In these etches, the n-type region of the crystal is removed at a faster rate than the p-type crystal, thus producing a step on the surface at the p-n junction, and also forming an etch pit at the point of emergence of the dislocation or junction. The path of the dislocation or boundary inside the crystal can be followed by means of infra-red transmission microscopy, using infra-red radiation of wavelength greater than that corresponding to the absorption edge (i.e. a wavelength greater than $1.1 \times 10^{-4}$ cm.). The wafer can then be further cut into slices, if desired, to isolate particular dislocations, groups of dislocations, or boundaries.

The present invention will thus be seen to involve adapting the process disclosed in the hereinbefore mentioned specification to the production of a transistor structure of the unipolar type. Thus, in the case of the configuration shown in FIG. 2, diffusion and precipitation on a substantially plane internal boundary is produced, and after the p-n structure has been formed, the appropriate region of the crystal is delineated by etching and then isolated, for example by cutting or grinding. Ohmic contacts are then made to the gate regions 4, and n- or p-type contacts, as appropriate, made to the current carrying region 1. In the case when this region is of n-type, the contacts should contain an n-type impurity activator, and vice-versa. For instance, a gold wire containing a small trace of antimony (an n-type material) may be alloyed to the n-type core and aluminium may be alloyed to the p-type material.

For the case of the cylindrical configuration of FIG. 3, diffusion and precipitation on a single dislocation is used, as described in the specification of application Serial No. 15,934. The subsequent procedure is then just as described above for the plane, or rectangular, case.

Figure 4:
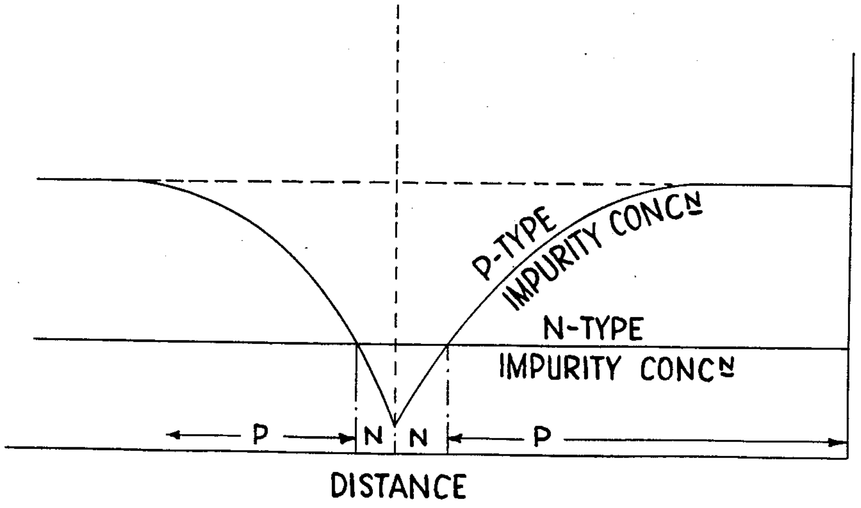

In both the rectangular and cylindrical cases, it is necessary to ensure that the net impurity activator concentration in the current carrying region 1, adjacent to the single dislocation or the planar boundary, should be fairly small and less than the net impurity activator concentration in the surrounding bulk material. For the case of silicon as the semiconductor and aluminium and phosphorus as the p-type and n-type impurities, the impurity distribution should therefore be of the character illustrated in FIG. 4 for the planar case.

While the invention has been particularly described in its application to unipolar transistors made from a body of mono-crystal silicon, it is obvious that any other suitable semi-conductor in which annular phenomena takes place could be used.

What we claim is:

1. A process of producing a unipolar transistor structure which consists in heating a body of mono-crystal semiconductor material containing impurity activators of both conductivity types and characterized by a crystal structure containing a crystal defect, one of said impurity activators being present initially at a higher concentration than that of another of said impurity activators of opposite conductivity type to said one activator, said heating being effected to a temperature below the melting point of said material so as to produce controlled diffusion and precipitation in the region of said crystal defect of at least one of said activators, whereby to cause one type of impurity activator which is present initially at the higher concentration in the region immediately surrounding said defect to be depleted or rendered inactive, and thereby to form an adjacent region of opposite conductivity type to that of the body, and attaching to the body at opposite ends of the region so produced contacts making ohmic connection to the region and rectifying connection to the body, one or more ohmic contacts being made to the body for the purpose of enabling the electric field extending across said region, and thereby the current flow between the contacts at the opposite ends of said region, to be controlled.

2. A process of producing a unipolar transistor from mono-crystal semiconductor material which consists in producing from a melt of material containing impurity activators of both conductivity types an ingot of mono-crystal material containing crystal defects, one of the impurity activators possessing a greater diffusion rate in the material than the other, cutting from the ingot a wafer including one such defect, heating the wafer to a temperature below the melting point of the material of the wafer in such conditions as to cause a greater concentration of the impurity activator having the higher diffusion rate in the vicinity of said defect and thereby to form at least one p-n junction thereabout, etching the wafer before or after the heating to locate the intersection of the defect with opposite surfaces of the wafer, and then affixing to the wafer at opposite ends of the junction so provided contacts making ohmic connection to the region within the junction of opposite conductivity type to that of the body and rectifying connection to the body, one or more ohmic contacts being made to the body for the purpose of enabling the electric field extending across said region, and thereby the current flow between the contacts at the opposite ends of said region, to be controlled.

3. A process as claimed in claim 2 in which when silicon is employed as the semiconductor, and aluminium and phosphorus are used as the activator impurities, the aluminium is present in the melt from which the body is obtained in a concentration of about $10^{17}$ atoms per cc. and the phosphorus in a concentration of about $3 \times 10^{16}$ atoms per cc., and the body is heated in the temperature range of 1200 to 1250° C.

4. A process as claimed in claim 3, in which the mono-crystal body is obtained from a melt in which a high concentration of oxygen is present.

5. A process as claimed in claim 1, in which when silicon is employed as the semiconductor, and aluminium and phosphorus are used as the activator impurities, the aluminium is present in the melt from which the body is obtained in a concentration of about $10^{17}$ atoms per cc., and the phosphorus in a concentration of about $3 \times 10^{16}$ atoms per cc., and the body is heated in the temperature range of 1200 to 1250° C.

No references cited.